United States Patent
Tatari et al.

(10) Patent No.: US 6,342,736 B1
(45) Date of Patent: Jan. 29, 2002

(54) INVERTERLESS CIRCUIT FOR AN UNINTERRUPTIBLE POWER SUPPLY

(75) Inventors: Mehmet Ebubekir Tatari; Sobhy Farag Abdelsalam, both of Cairo (EG)

(73) Assignee: Rimasoft, L.L.C., Duluth, GA (US)

( * ) Notice: Subject to any disclaimer, the term of this patent is extended or adjusted under 35 U.S.C. 154(b) by 0 days.

(21) Appl. No.: 09/511,919

(22) Filed: Feb. 24, 2000

(51) Int. Cl.[7] .................................................. H02J 7/00
(52) U.S. Cl. ............................ 307/66; 307/64; 307/80; 307/43
(58) Field of Search .............................. 307/66, 46, 65, 307/45, 64, 80, 87, 43; 363/15

(56) References Cited

U.S. PATENT DOCUMENTS 4,564,767 A * 1/1986 Charych ..................... 307/66
5,070,251 A * 12/1991 Rhodes et al. .............. 307/46
6,225,708 B1 5/2001 Furukawa et al. .......... 307/66

* cited by examiner

*Primary Examiner*—Josie Ballato
*Assistant Examiner*—Robert L. Deberadinis
(74) *Attorney, Agent, or Firm*—Needle & Rosenberg, P.C.

(57) ABSTRACT

An inverterless uninterruptible power supply includes a battery and a clock circuit that generates a first periodic signal having a first frequency. An AC supply detection circuit generates a line control signal that is un-asserted when an AC supply is capable of supplying power above a predetermined threshold and is asserted when the AC supply is not capable of supplying power above the predetermined threshold. A control gate is responsive to the first periodic signal and to the line control signal. The control gate generates a power control signal. The power control signal is a periodic signal having the first frequency when the line control signal is asserted and is zero when the line control signal is un-asserted. A power transistor is gated by the power control signal, and periodically transfers current from the battery to the load at the first frequency.

12 Claims, 1 Drawing Sheet

INVERTERLESS CIRCUIT FOR AN UNINTERRUPTIBLE POWER SUPPLY

BACKGROUND OF THE INVENTION

1. Field of the Invention

The present invention relates to power supplies and, more specifically, to an uninterruptible power supply.

2. Description of the Prior Art

Computers, such as personal computers, often face power problems from the main alternating current (AC) power supply such as blackouts (total losses of power) and brown-outs (very short interruptions), spikes, transients, sags, surges and various types of noise. Such problems cause considerable damage to computer systems, including system lock-ups and complete corruption or loss of data. Many computers employ uninterruptible power supplies to ensure trouble-free operation.

Existing uninterruptible power supplies use a battery to provide power during blackouts and other transients. An inverter transforms the direct current (DC) from the battery to alternating current having characteristics similar to the current produced by the main AC power supply. Inverters, however, have relatively high failure rates due to the type and number of components that they employ.

Therefore, there is a need for an inverterless uninterruptible power supply.

SUMMARY OF THE INVENTION

The disadvantages of the prior art are overcome by the present invention which, in one aspect, is an inverterless circuit for an uninterruptible power supply that includes a battery. A clock circuit generates a first periodic signal having a first frequency. An AC supply detection circuit generates a line control signal that is un-asserted when an AC supply is capable of supplying power above a predetermined threshold and is asserted when the AC supply is not capable of supplying power above the predetermined threshold. A control gate is responsive to the first periodic signal and to the line control signal. The control gate generates a power control signal. The power control signal is a periodic signal having the first frequency when the line control signal is asserted and is zero when the line control signal is un-asserted. A power transistor is gated by the power control signal, and periodically transfers current from the battery to the load at the first frequency.

Another aspect of the invention is a method of providing power to a load from a battery. A voltage of an AC power supply is sensed. A line control signal is asserted when the voltage is below a predetermined threshold. A plurality of periodic pulses is generated. The plurality of pulses is AND'ed with the line control signal, thereby generating a pulsed signal when the voltage is below the predetermined threshold. A power transistor is gated with the pulsed signal. The power transistor is capable of electrically coupling the battery to the load,.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
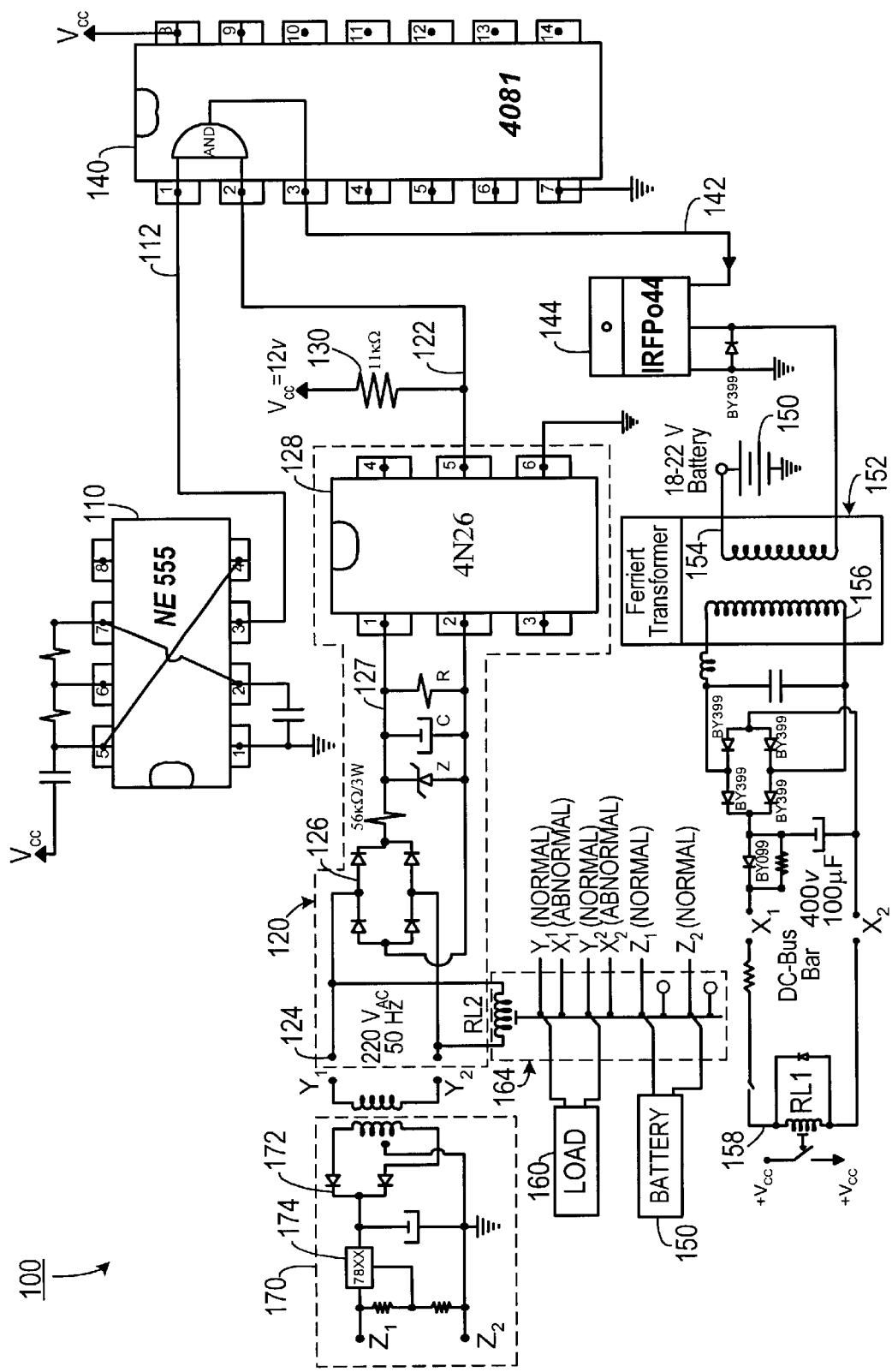
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, the invention is an inverterless circuit for an uninterruptible power supply 100 that includes a battery 150 and an inverterless circuit. The inverterless circuit includes a clock circuit 110, such as a clock generation chip (for example an NE 555) that generates a first periodic signal 112 having a first frequency. The first frequency would typically correspond to the normal AC line frequency.

An AC supply detection circuit 120 generates a line control signal 122 that is un-asserted when an AC supply 124 is capable of supplying power above a predetermined threshold. The predetermined threshold would typically correspond to a minimum expected line voltage under normal power conditions. Thus anything below the predetermined threshold would correspond to a brown-out, a black-out, or some other abnormal condition. The line control signal 122 is asserted when the AC supply 124 is not capable of supplying power above the predetermined threshold.

The alternating current supply detection circuit includes a rectifying circuit 126 that generates a rectified signal 127 from the AC supply. A line controller 128 (e.g., a 4N26 line controller chip) is responsive to the rectified signal 124. The line control signal 122 is transmitted from the output pin (i.e., PIN 5 of the controller shown) of the line controller 128. The line controller 128 pulls the output pin down to ground when the rectified signal 127 has a value above the predetermined threshold. When the value of the rectified signal 127 goes below the predetermined threshold, the line controller 128 allows the output pin (and, thus, the line control signal 122) to float. A resistor 130 electrically couples the output pin to a DC power supply so that when the output pin is allowed to float, the line control signal 122 goes to the power supply voltage and is, thus, asserted.

An AND gate 140, AND's the first periodic signal 112 and the line control signal 122 so as to generate a power control signal 142. Thus, the power control signal 142 is a periodic signal having the first frequency when the line control signal 122 is asserted. When the line control signal 122 is unasserted, the power control signal 142 is zero.

A power transistor 144 (e.g., and IRFPo44 power transistor) is gated by the power control signal 142. The power transistor 144 periodically transfers current from the battery 150 to the load 160 (which could be, e.g., at the first frequency. Typically, this is done by periodically gating current from the battery 150 through a low impedance side 154 of a transformer 152 (such as a Ferriert transformer). The frequency of the current gating is the first frequency. The low impedance side 154 is coupled to a high impedance side 156, which is electrically coupled to the load 160.

When the AC supply detection circuit 120 detects a below-threshold condition, it causes a relay circuit 164, which acts as an AC bus bar, to connect the load 160 to nodes $X_1$ and $X_2$, which receive power from the high impedance side 156 of the transformer 152. Otherwise, during normal power operation, the relay circuit 164 connects the load 160 to the normal AC power supply 124 via nodes $Y_1$ and $Y_2$.

The power supply also includes a battery charger circuit 170 that is capable a recharging the battery 150 (the same battery as the one connected to the transformer 152) with current from the AC supply 124 when the voltage is above the predetermined threshold. The battery charger circuit comprises a bridge circuit 172 that rectifies the current from the AC supply 124 and delivers the rectified current to current regulator 174, such as a 78XX-series regulator (e.g., 7815, 7812, etc., depending upon the specific power requirements of the system). During normal operation, the relay circuit 164 connects the battery 150 to the battery charger circuit 170 via nodes $Z_1$ and $Z_2$. When the inverterless circuit is activated (e.g., during a brown out or black out), the relay circuit 164 disconnects the battery 150 from the battery charger circuit 170.

Once an abnormal condition arises, a continuity relay circuit 158 maintains power from the battery 150 until normal AC power is restored. The relay RL1 maintains the presence of energy on the DC Bus bar once normal power is sensed.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An inverterless circuit for an uninterruptible power supply that includes a battery, comprising:
   a. a clock circuit that generates a first periodic signal having a first frequency;
   b. an AC supply detection circuit that generates a line control signal that is un-asserted when an AC supply is capable of supplying power above a predetermined threshold and that is asserted when the AC supply is not capable of supplying power above the predetermined threshold;
   c. a control gate, responsive to the first periodic signal and to the line control signal, that generates a power control signal, the power control signal being a periodic signal having the first frequency when the line control signal is asserted and being zero when the line control signal is un-asserted; and
   d. a power transistor that is gated by the power control signal, and that periodically transfers current from the battery to a load at the first frequency.

2. The inverterless circuit of claim 1, wherein the clock circuit comprises a clock generation chip.

3. The inverterless circuit of claim 1, further comprising a transformer, having a low impedance side electrically coupled to the battery and a high impedance side electrically coupled to the load.

4. The inverterless circuit of claim 3, wherein the transformer is a Ferriert transformer.

5. The inverterless circuit of claim 1, wherein the control gate comprises an AND gate.

6. The inverterless circuit of claim 5, wherein the alternating current supply detection circuit comprises:
   a. a rectifying circuit that generates a rectified signal from the AC supply;
   b. a line controller, responsive to the rectified signal, having an output pin, upon which is transmitted the line control signal, the line controller being capable of pulling the output pin down to ground when the rectified signal has a value above the predetermined threshold and the line controller also being capable of allowing the output pin to float when the rectified signal has a value above the predetermined threshold; and
   c. a resistor electrically coupling the output pin to a DC power supply so that when the output pin is allowed to float, the line control signal on the output pin is asserted.

7. The inverterless circuit of claim 1, further comprising a battery charger circuit that is capable a recharging the battery with current from the AC supply.

8. The inverterless circuit of claim 7, wherein the battery charger circuit comprises a bridge circuit electrically coupled to the battery.

9. A method of providing power to a load from a battery, comprising the steps of:
   a. sensing a voltage of an AC power supply;
   b. asserting a line control signal when the voltage is below a predetermined threshold;
   c. generating a plurality of periodic pulses;
   d. AND'ing the plurality of pulses with the line control signal, thereby generating a pulsed signal when the voltage is below the predetermined threshold; and
   e. gating a power transistor, capable of electrically coupling the battery to the load, with the pulsed signal.

10. The method of claim 9, further comprising the step of recharging the battery when the voltage is above the predetermined threshold.

11. An apparatus for providing power to a load from a battery, comprising:
   a. means for sensing a voltage of an AC power supply;
   b. means for asserting a line control signal when the voltage is below a predetermined threshold;
   c. means for generating a plurality of periodic pulses;
   d. means for AND'ing the plurality of pulses with the line control signal, thereby generating a pulsed signal when the voltage is below the predetermined threshold; and
   e. means for gating a power transistor, capable of electrically coupling the battery to the load, with the pulsed signal.

12. The apparatus of claim 11, further comprising means for recharging the battery when the voltage is above the predetermined threshold.

* * * * *